(12) United States Patent
Zhamu et al.

(10) Patent No.: US 11,247,906 B2
(45) Date of Patent: Feb. 15, 2022

(54) ELECTROCHEMICAL PRODUCTION OF GRAPHENE SHEETS DIRECTLY FROM GRAPHITE MINERAL

(71) Applicant: Angstron Materials, Inc., Dayton, OH (US)

(72) Inventors: Aruna Zhamu, Springboro, OH (US); Bor Z Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 89 days.

(21) Appl. No.: 14/998,944

(22) Filed: Mar. 9, 2016

(65) Prior Publication Data
US 2017/0260637 A1    Sep. 14, 2017

(51) Int. Cl.
  *C01B 32/19*    (2017.01)
  *C25B 1/00*    (2021.01)
  *C25B 9/40*    (2021.01)

(52) U.S. Cl.
  CPC ............. *C01B 32/19* (2017.08); *C25B 1/00* (2013.01); *C25B 9/40* (2021.01); *C01B 2204/02* (2013.01); *C01B 2204/04* (2013.01)

(58) Field of Classification Search
  CPC . B82Y 30/00; B82Y 40/00; C01B 32/15–198; Y10S 977/734; Y10S 977/842; Y10S 977/845
  See application file for complete search history.

(56) References Cited

U.S. PATENT DOCUMENTS

| | | |
|---|---|---|
| 5,698,088 A | 12/1997 | Kang |
| 6,872,330 B2 | 3/2005 | Mack et al. |

(Continued)

FOREIGN PATENT DOCUMENTS

ES    2529189 A1 *    2/2015

OTHER PUBLICATIONS

Pierson, H.O.. (1993). Handbook of Carbon, Graphite, Diamond and Fullerenes—Properties, Processing and Applications—Chapter 10. Natural Graphite, Graphite Powders, Particles, and Compounds. (Year: 1993).*

(Continued)

*Primary Examiner* — Salil Jain (57) ABSTRACT

A method of producing graphene sheets directly from graphite mineral (graphite rock) powder, comprising: (a) forming an intercalated graphite compound by an electrochemical intercalation procedure conducted in an intercalation reactor, containing (i) a liquid solution electrolyte comprising an intercalating agent and a graphene plane-wetting agent dissolved therein; (ii) a working electrode that contains the graphite material powder as an active material; and (iii) a counter-electrode, and wherein a current is imposed upon the working electrode and counter electrode at a current density sufficient for effecting electrochemical intercalation of the intercalating agent and/or wetting agent into interlayer spacing, wherein the wetting agent is selected from melamine, ammonium sulfate, sodium dodecyl sulfate, Na(ethylenediamine), tetraalkylammonium salts, ammonia, carbamide, hexamethylenetetramine, organic amine, poly (sodium-4-styrene sulfonate), or a combination thereof; and (b) exfoliating and separating the intercalated graphite compound using ultrasonication, thermal shock exposure, and/or a mechanical shearing treatment to produce graphene sheets.

26 Claims, 4 Drawing Sheets

(56) References Cited

U.S. PATENT DOCUMENTS

| | | | |
|---|---|---|---|
| 7,071,258 B1 | 7/2006 | Jang et al. | |
| 7,166,266 B2 * | 1/2007 | Nikolaev | B82Y 30/00 423/460 |
| 7,327,000 B2 | 2/2008 | DeHeer et al. | |
| 7,824,651 B2 | 11/2010 | Zhamu et al. | |
| 9,221,687 B2 | 12/2015 | Loh et al. | |
| 2008/0206124 A1 * | 8/2008 | Jang | B82Y 30/00 423/415.1 |
| 2009/0026086 A1 | 1/2009 | Zhamu et al. | |
| 2009/0155578 A1 * | 6/2009 | Zhamu | B82Y 30/00 428/336 |
| 2010/0206363 A1 * | 8/2010 | Choi | C01B 32/182 136/252 |
| 2011/0046027 A1 * | 2/2011 | Zhamu | C10M 103/02 508/113 |
| 2011/0130494 A1 * | 6/2011 | Penicaud | B82Y 30/00 524/104 |
| 2011/0311432 A1 * | 12/2011 | Pu | B82Y 30/00 423/460 |
| 2012/0228556 A1 * | 9/2012 | Roundhill | B82Y 30/00 252/510 |
| 2012/0321545 A1 * | 12/2012 | Jeon | C01B 32/225 423/448 |
| 2013/0001089 A1 * | 1/2013 | Li | B82Y 40/00 205/106 |
| 2013/0022530 A1 * | 1/2013 | Mercuri | B82Y 40/00 |
| 2013/0102084 A1 * | 4/2013 | Loh et al. | B01J 21/185 |
| 2013/0171055 A1 * | 7/2013 | Wang | H01M 4/587 423/448 |
| 2013/0320274 A1 | 12/2013 | Walters et al. | |
| 2013/0337351 A1 * | 12/2013 | Drzal | C01B 3/0021 429/416 |
| 2014/0061059 A1 | 3/2014 | Dryfe | |
| 2014/0231718 A1 | 8/2014 | Lin et al. | |
| 2014/0255795 A1 | 9/2014 | Manthiram et al. | |
| 2015/0275378 A1 * | 10/2015 | Koo | C01B 32/19 205/615 |
| 2015/0376014 A1 * | 12/2015 | Cesareo | B82Y 30/00 442/86 |
| 2016/0115372 A1 * | 4/2016 | Chakraborty | C09K 8/592 166/303 |
| 2017/0050856 A1 * | 2/2017 | Ming | C01B 31/0484 |
| 2017/0203968 A1 | 7/2017 | Al-Hazmi et al. | |
| 2017/0233255 A1 * | 8/2017 | Zhamu et al. | C01B 31/0469 |

OTHER PUBLICATIONS

PCT/US17/17458 International Search Report and Written Opinion dated Apr. 27, 2017, 9 pages.

Hummers et al., "Preparation of Graphitic Oxide" Journal of the American Chemical Society (1958) p. 1339.

Jang et al., "Processing of Nano Graphene Platelets (NGPs) and NGP Nanocomposites: A Review" Journal of Materials Science (2008) vol. 43, pp. 5092-5101.

Yang et al., "Two-dimensional Graphene Nanoribbons" Journal of the American Chemical Society (2008) vol. 130, pp. 4216-4217.

B. Z. Jang and A Zhamu, "Processing of Nano Graphene Platelets (NGPs) and NGP Nanocomposites: A Review," J. Materials Sci. 43 (2008) 5092-5101.

William S. Hummers, Jr., et al., Preparation of Graphitic Oxide, Journal of the American Chemical Society, 1958, p. 1339.

Yang, et al. "Two-dimensional Graphene Nano-ribbons," J. Am. Chem. Soc. 130 (2008) 4216-17.

Wang, Junzhong, et al. "High-yield synthesis of few-layer graphene flakes through electrochemical expansion of graphite in propylene carbonate electrolyte." Journal of the American Chemical Society 133.23 (2011): 8888-8891.

Kakaei, Karim. "One-pot electrochemical synthesis of graphene by the exfoliation of graphite powder in sodium dodecyl sulfate and its decoration with platinum nanoparticles for methanol oxidation." Carbon 51 (2013): 195-201.

Abdelkader, A. M., et al. "How to get between the sheets: a review of recent works on the electrochemical exfoliation of graphene materials from bulk graphite." Nanoscale 7.16 (2015): 6944-6956.

U.S. Appl. No. 14/998,784 Final Office Action dated Jun. 1, 2018, 24 pages.

U.S. Appl. No. 14/998,784 Nonfinal Office Action dated Mar. 28, 2018, 18 pages.

U.S. Appl. No. 14/998,784 Final Office Action dated Mar. 1, 2019, 29 pages.

U.S. Appl. No. 14/998,784 Nonfinal Office Action dated Oct. 10, 2018, 27 pages.

U.S. Appl. No. 14/998,784 Final Office Action dated Feb. 7, 2020, 21 pages.

U.S. Appl. No. 14/998,784 Nonfinal Office Action dated Jul. 17, 2019, 25 pages.

U.S. Appl. No. 14/998,784 Nonfinal Office Action dated Jun. 18, 2020, 18 pages.

U.S. Appl. No. 14/998,784 Nonfinal Office Action dated Oct. 24, 2019, 20 pages.

* cited by examiner

ELECTROCHEMICAL PRODUCTION OF GRAPHENE SHEETS DIRECTLY FROM GRAPHITE MINERAL

FIELD OF THE INVENTION

The present invention relates to a method of producing isolated thin graphene sheets (single-layer or few-lay) directly from natural graphite mineral (milled graphite rock without purification).

BACKGROUND

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274, 473, submitted on Oct. 21, 2002; now U.S. Pat. No. 7,071, 258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Our research has yielded a process for chemical-free production of isolated nano graphene platelets that is novel in that is does not follow the established methods for production of nano graphene platelets outlined below. In addition, the process is of enhanced utility in that it is cost effective, and provided novel graphene materials with significantly reduced environmental impact. Four main prior-art approaches have been followed to produce NGPs. Their advantages and shortcomings are briefly summarized as follows:

Approach 1: Chemical Formation and Reduction of Graphite Oxide (GO) Platelets

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=½\ d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.

(2) The chemical treatment process requires a long intercalation and oxidation time, typically 5 hours to five days.

(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.

(4) Both heat- and solution-induced exfoliation approaches require a very tedious washing and purification step. For instance, typically 2.5 kg of water is used to wash and recover 1 gram of GIC, producing huge quantities of waste water that need to be properly treated.

(5) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(6) Furthermore, the quantity of intercalation solution retained on the flakes after draining may range from 20 to 150 parts of solution by weight per 100 parts by weight of graphite flakes (pph) and more typically about 50 to 120 pph.

(7) During the high-temperature exfoliation, the residual intercalate species (e.g. sulfuric acid and nitric acid) retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to overcome the limitations outlined above.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium metal melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present invention was made to overcome the limitations outlined above.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Hence, an urgent need exists to have a graphene production process that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets.

It may be noted that Kang, et al [F. Kang, "Formic Acid-Graphite Intercalation Compound," U.S. Pat. No. 5,698,088 (Dec. 16, 1997)] used an electrochemical method to intercalate natural flake graphite with formic acid for the purpose of producing flexible graphite products. Zhamu, et al. (U.S. Pat. No. 8,524,067) used an electrochemical method to intercalate natural graphite with carboxylic acid for the purpose of producing graphene sheets. These prior art processes all begin with highly purified natural graphite, not directly from graphite rock or mined graphite ore.

Natural graphite is obtained by mining graphite-rich ore (commonly referred to as graphite rock) and milling it down to the consistency of sand to allow the graphite to be removed. The milled material is then subjected to purification treatments that typically include a series of flotation processes to extract the graphite. These procedures are known to be highly polluting to the environment. Loh, et al. (U.S. Pat. No. 9,221,687, issued on Dec. 29, 2015 and US Pub. No. 2013/0102084) discloses an electrochemical method of producing expanded graphite and graphene sheets from a slurry composed of (a) 15-20 wt. % of graphite rock, (b) 0.1-5 wt. % of graphite flake, and (c)70-80 wt. % of an electrolyte consisting of 80-160 g/L of $LiClO_4$ (5-10 wt. %) in propylene carbonate. Such a process still requires the use of some purified or purified and further processed graphite flakes (so called "natural graphite" or expanded graphite) in the reacting slurry. Furthermore, the requirement to have a low proportion (only 15-20 wt. %) of graphite rock and a high electrolyte proportion (70-80 wt. %) in an electrochemical slurry implies that this is not an economically viable process dues to the low production rate and high electrolyte costs.

Clearly, a need exists to have a more cost-effective process that produces graphene sheets (particularly single-layer graphene and few-layer graphene sheets) directly from graphite rock. Such a process not only avoids the environment-polluting graphite ore purification procedures but also makes it possible to have low-cost graphene available. As of today, the graphene, as an industry, has yet to emerge mainly due to the extremely high graphene costs that have thus far prohibited graphene-based products from being widely accepted in the marketplace.

SUMMARY OF THE INVENTION

The present invention provides a method of producing isolated graphene sheets having an average thickness smaller than 10 nm (preferably and typically single-layer graphene or few-layer graphene) directly from a graphite mineral (e.g. milled graphite rock) having hexagonal carbon atomic interlayers (graphene planes) with an interlayer spacing (inter-graphene plane spacing). The method comprises:

(a) forming an intercalated graphite compound by an electrochemical intercalation procedure which is conducted in an intercalation reactor, wherein the reactor contains (i) a liquid solution electrolyte comprising an intercalating agent and a graphene plane-wetting agent (briefly "wetting agent") dissolved therein; (ii) a working electrode (e.g. anode) that contains the graphite mineral powder as an active material in ionic contact with the liquid solution electrolyte; and (iii) a counter electrode (e.g. cathode) in ionic contact with the liquid solution electrolyte, and wherein a current is imposed upon the working electrode and the counter electrode at a current density for a duration of time sufficient for effecting electrochemical intercalation of the intercalating agent and/or the wetting agent into the interlayer spacing, wherein the wetting agent is selected from melamine, ammonium sulfate, sodium dodecyl sulfate, sodium (ethylenediamine), tetraalkyammonium salts, ammonia, carbamide, hexamethylenetetramine, organic amine, poly(sodium-4-styrene sulfonate), or a combination thereof; and (b) exfoliating and separating the hexagonal carbon atomic interlayers from the intercalated graphite compound using an ultrasonication, thermal shock exposure, mechanical shearing treatment, or a combination thereof to produce the isolated graphene sheets.

The wetting agent-to-intercalating agent weight ratio is typically from 1/100 to 90/100, preferably from 5/100 to 70/100, and most preferably from 10/100 to 50/100 (i.e. from 1/10 to 1/2).

In some embodiments, multiple particles of the graphite mineral powder are dispersed in the liquid solution electrolyte. The resulting graphite mineral powder-electrolyte mixture is disposed in a working electrode compartment (e.g. in the anode side) and supported by a current collector (e.g. a sheet of metal foil or grid) or confined by a current collector (e.g. a porous metal cage or bucket having the mixture contained therein) in electronic contact therewith. The working electrode compartment and the multiple particles supported thereon or confined therein are not in electronic contact with the counter electrode so that there is no internal shorting.

In a preferred embodiment, multiple particles of graphite mineral dispersed in the liquid solution electrolyte (in the anode side) are clustered together to form a network of electron-conducting pathways.

In certain preferred embodiments, the method is conducted intermittently or continuously, wherein the supply of graphite mineral powder and the liquid solution electrolyte are provided into the reactor intermittently or continuously.

Preferably, the graphite mineral powder contains a proportion of layered graphite material in the range from 20% to 97% by weight, more preferably from 30% to 95% by weight, and further more preferably from 50% to 90%.

Preferably, the working electrode contains no other graphite material as an electrode active material to be intercalated (i.e. only graphite mineral, such as milled graphite rock).

Preferably, the graphite mineral powder in the working electrode compartment is dispersed in the liquid solution electrolyte at a concentration higher than 20% by weight, more preferably higher than 40% by weight, and further more preferably higher than 50% by weight.

The mechanical shearing treatment may comprise operating air milling, air jet milling, ball milling, rotating-blade mechanical shearing, or a combination thereof. The thermal shock exposure comprises heating the intercalated graphite to a temperature in the range of 300-1,200° C. for a period of 15 seconds to 2 minutes.

The imposing current provides a current density preferably in the range of 0.1 to 600 A/m$^2$, more preferably in the range of 1 to 500 A/m$^2$, and most preferably in the range of 10 to 300 A/m$^2$.

Desirably and typically, the isolated graphene sheets produced contain single-layer graphene and/or few-layer graphene having 2-10 hexagonal carbon atomic interlayers or graphene planes.

The electrochemical intercalation may include intercalation of both the intercalating agent and the wetting agent into the interlayer spacing. The intercalated graphite compound preferably contains Stage-1, Stage-2, or a combination of Stage-1 and Stage-2 graphite intercalation compounds.

The method may further comprise a step of re-intercalating the isolated graphene sheets (if not all single-layer) using an electrochemical or chemical intercalation method to obtain intercalated graphene sheets and a step of exfoliating and separating the intercalated graphene sheets to produce single-layer graphene sheets using ultrasonication, thermal shock exposure, exposure to water solution, mechanical shearing treatment, or a combination thereof.

The intercalating agent may contain a Brønsted acid selected from phosphoric acid ($H_3PO_4$), dichloroacetic ($Cl_2CHCOOH$), or an alkylsulfonic acid selected from methanesulfonic ($MeSO_3H$), ethanesulfonic ($EtSO_3H$), or 1-propanesulfonic (n-$PrSO_3H$), or a combination thereof.

In certain embodiments, the intercalating agent includes a metal halide. More specifically, the intercalating agent includes a metal halide selected from the group consisting of MCl (M=Li, Na, K, Cs), $MCl_2$ (M=Zn, Ni, Cu, Mn), $MCl_3$ (M=Al, Fe, Ga), $MCl_4$ (M=Zr, Pt), $MF_2$ (M=Zn, Ni, Cu, Mn), $MF_3$ (M=Al, Fe, Ga), $MF_4$ (M=Zr, Pt), and combinations thereof.

In some embodiments, the intercalating agent includes an alkali metal salt selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), a sodium ionic liquid salt, lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

In some embodiments, the intercalating agent includes an organic solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), propylene carbonate (PC), dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, or a combination thereof

DETAILED DESCRIPTION OF PREFERRED EMBODIMENTS

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic structure."

Basically, a graphite material is composed of many graphene planes (hexagonal carbon atomic interlayers) stacked together having inter-planar spacing. These graphene planes can be exfoliated and separated to obtain isolated graphene sheets that can each contain one graphene plane or several graphene planes of hexagonal carbon atoms. Further, natural graphite refers to a graphite material that is produced from purification of graphite mineral (mined graphite ore or graphite rock) typically by a series of flotation and acid treatments. Particles of natural graphite are then subjected to intercalation/oxidation, expansion/exfoliation, and separation/isolation treatments as discussed in the Background section. The instant invention obviates the need to go through the purification procedures that otherwise generate great amounts of polluting chemicals.

One preferred specific embodiment of the present invention is a method of producing isolated graphene sheets, also called nano graphene platelets (NGPs), directly from graphite rock or graphite ore without purification. Each graphene sheet comprises one or multiple planes of two-dimensional hexagonal structure of carbon atoms. Each graphene sheet has a length and a width parallel to the graphene plane and a thickness orthogonal to the graphene plane. By definition, the thickness of an NGP is 100 nanometers (nm) or smaller (more typically <10 nm and most typically and desirably <3.4 nm), with a single-sheet NGP (single-layer graphene) being as thin as 0.34 nm. The length and width of a NGP are typically between 1 μm and 20 μm, but could be longer or shorter. For certain applications, both length and width are smaller than 1 μm.

Figure 1:
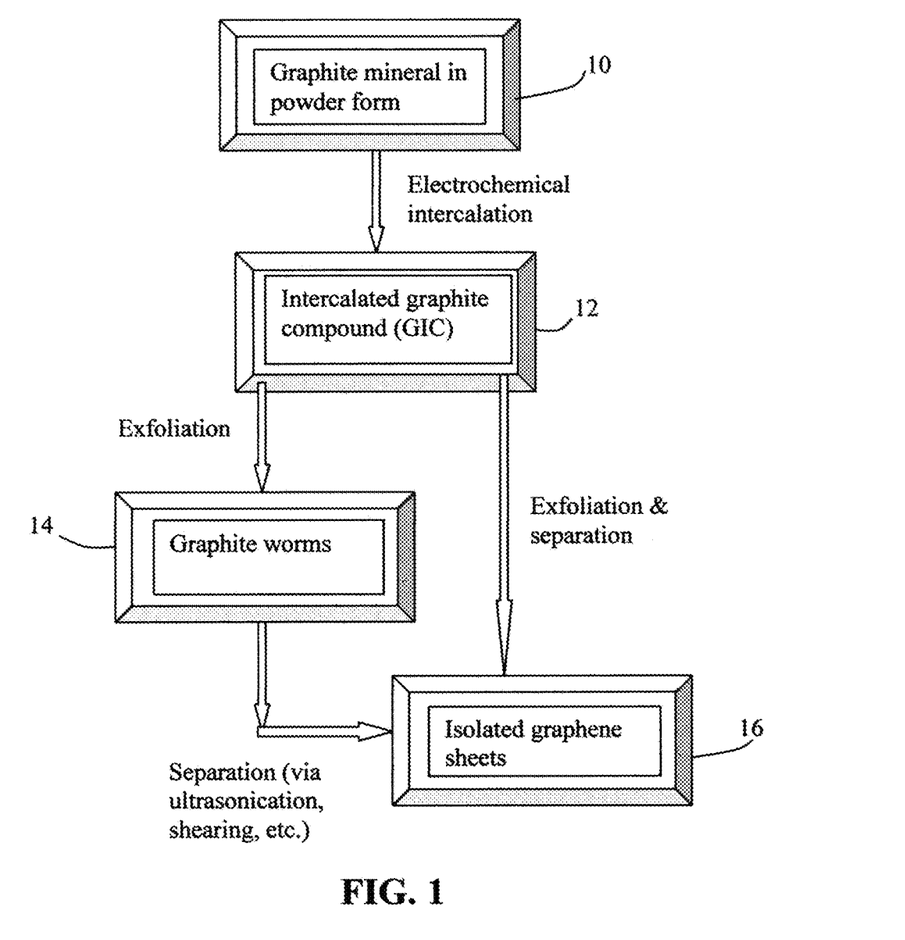
FIG. 1 A flow chart showing an embodiment of the presently invented method of producing isolated graphene sheets.

Generally speaking, as schematically shown in FIG. 1, a method has been developed for converting a layered or laminar graphite material (graphite mineral) 10 to isolated graphene sheets 16 having an average thickness smaller than 10 nm, more typically smaller than 5 nm, and further more typically thinner than 3.4 nm (in many cases, mostly single-layer graphene). The method comprises (a) forming an intercalated graphite compound 12 by an electrochemical intercalation procedure conducted in a reactor, which contains (i) a liquid solution electrolyte containing an intercalating agent and a graphene plane-wetting agent dissolved therein; (ii) a working electrode (e.g. anode) comprising multiple particles of graphite mineral powder 10 immersed in the liquid solution electrolyte; and (iii) a counter electrode (e.g. a cathode comprising a metal or graphite rod) and wherein a current is imposed upon the working electrode and the counter electrode at a current density for a duration of time sufficient for effecting the electrochemical intercalation; and (b) exposing the intercalated graphite compound 12 to a thermal shock, a water solution exposure, and/or an ultrasonication (or other mechanical shearing) treatment.

In this Step (b), thermal shock exposure may be conducted if some organic species have been intercalated into inter-graphene plane spaces to produce separated graphene sheets. If the anode contains Stage-1 graphite intercalation compounds, thermal shock alone can produce separated graphene sheets 16. Otherwise, thermal shock leads to the formation of exfoliated graphite 14 (also referred to as graphite worms), which is then subjected a mechanical shearing treatment or ultrasonication to produce the desired isolated graphene sheets 16. If the graphite intercalation compounds contain mainly alkali metal ions (Li, Na, and/or K) residing in inter-graphene plane spaces, the resulting alkali metal-intercalated graphite compounds may be immersed in water or water-alcohol solution (with or without sonication) to effect exfoliation and separation of graphene sheets.

The exfoliation step preferably comprises heating the intercalated graphite to a temperature in the range of 300-1,200° C. for a duration of 10 seconds to 2 minutes, most preferably at a temperature in the range of 600-1,000° C. for a duration of 30-60 seconds. The exfoliation step in the instant invention does not involve the evolution of undesirable species, such as $NO_x$ and $SO_x$, which are common by-products of exfoliating conventional sulfuric or nitric acid-intercalated graphite compounds.

Figure 2:
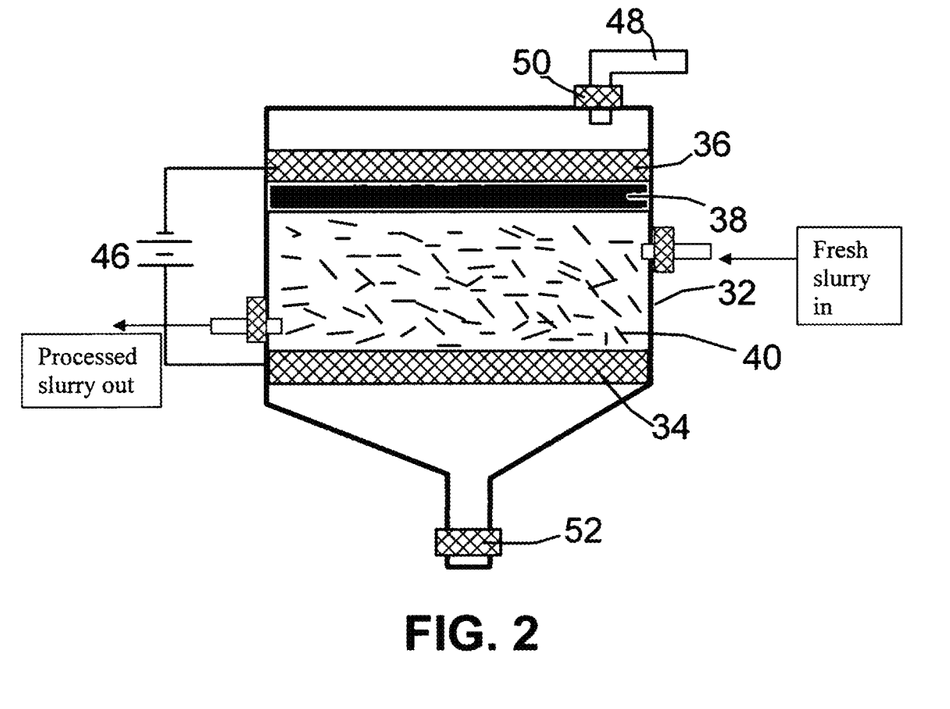
FIG. 2 Schematic drawing of an apparatus for electrochemical intercalation of graphite.
Figure 3A:
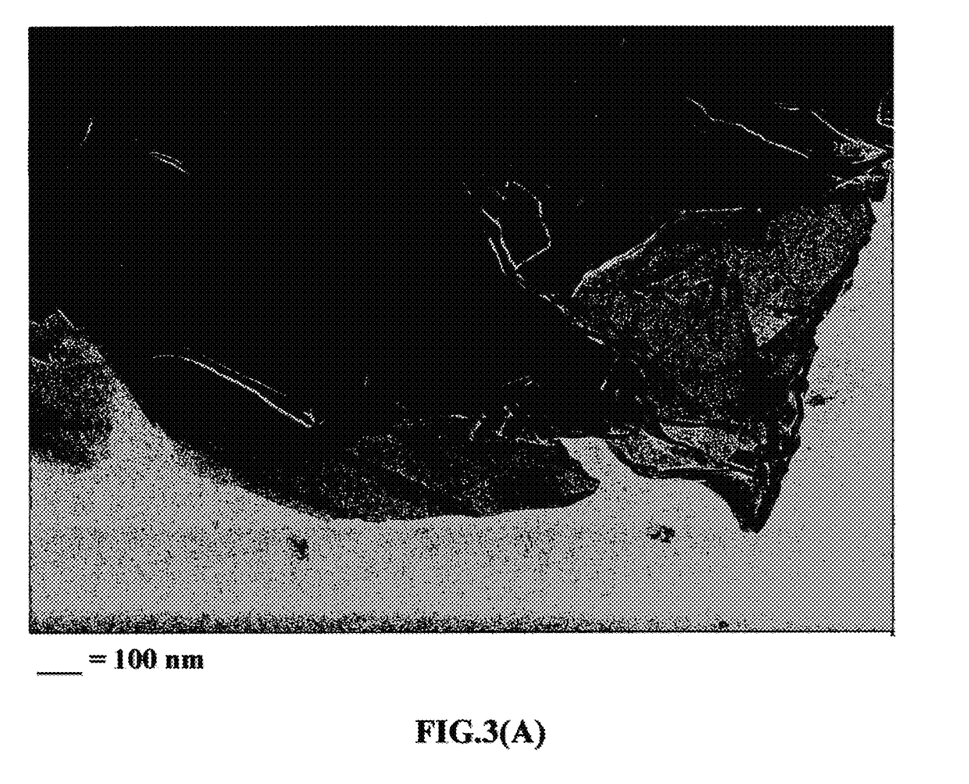
FIG. 3(A) SEM image of graphene sheets produced by the presently invented electrochemical intercalation method.
Figure 3B:
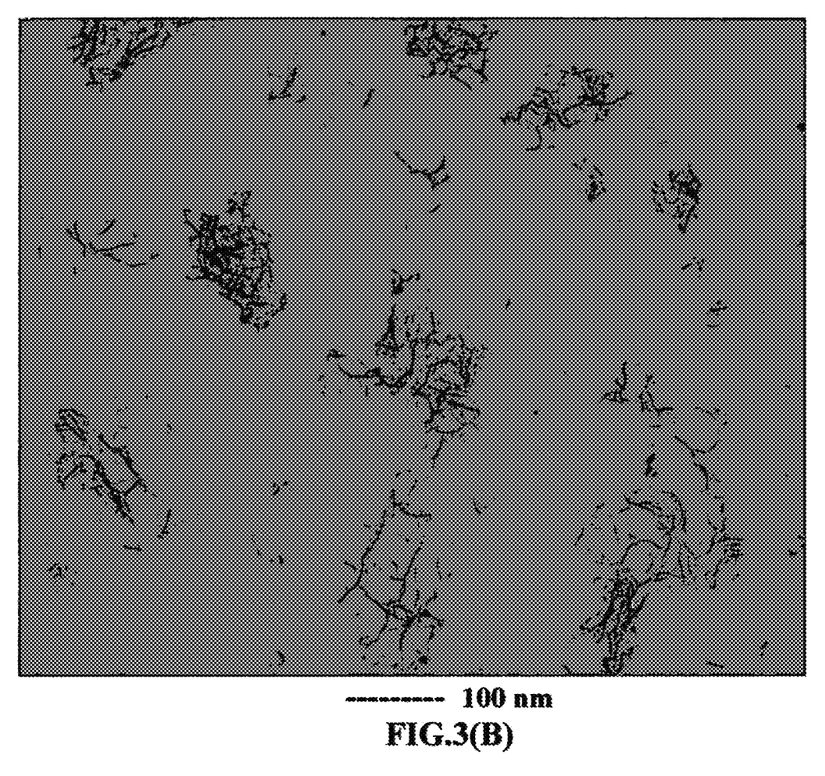
FIG. 3(B) Transmission electron micrograph of graphene sheets produced by conventional chemical intercalation and oxidation of graphite using strong sulfuric acid and highly oxidizing agent.

Schematically shown in FIG. 2 is an apparatus (as an example) that can be used for electrochemical intercalation of graphite according to a preferred embodiment of the present invention. The apparatus comprises a container 32 to accommodate electrodes and electrolyte. The anode is comprised of multiple graphite mineral particles 40 that are dispersed in a liquid solution electrolyte (e.g., sodium (ethylenediamine) mixed with NaCl-water solution) and are supported by a porous anode supporting element 34, preferably a porous metal plate, such as nickel, titanium, or stainless steel. The graphite mineral particles 40 preferably form a continuous network of electron-conducting pathways with respect to the anode support plate 34, but are accessible to the intercalate in the liquid electrolyte solution. In some preferred embodiments, such a network of electron-conducting pathways may be achieved by dispersing and packing >20% by wt. of graphite rock or graphite ore (preferably >30% by wt. and more preferably >40% by wt.), plus some optional conductive fillers, in the electrolyte. An electrically insulating, porous separator plate 38 (e.g., Teflon fabric or glass fiber mat) is placed between the anode and the cathode 36 to prevent internal short-circuiting. A DC current source 46 is used to provide a current to the anode support element 34 and the cathode 36. The imposing current used in the electrochemical reaction preferably provides a current density in the range of 1.0 to 600 $A/m^2$, more preferably in the range of 10 to 400 $A/m^2$. Fresh electrolyte (intercalate) may be supplied from an electrolyte source (not shown) through a pipe 48 and a control valve 50. Excess electrolyte may be drained through a valve 52. In some embodiments, the electrolyte can contain the graphite mineral dispersed therein and an additional amount of this graphite mineral-containing electrolyte (appearing like a slurry) may be continuously or intermittently introduced into the intercalation chamber. This will make a continuous process.

Thus, in some embodiments, the invention provides a method of producing isolated graphene sheets having an average thickness smaller than 10 nm (mostly less than 2 nm) directly from a graphite mineral material having hexagonal carbon atomic interlayers with an interlayer spacing, the method comprising:

(a) forming an intercalated graphite compound by an electrochemical intercalation procedure which is conducted in an intercalation reactor, wherein the reactor contains (i) a liquid solution electrolyte comprising an intercalating agent and a graphene plane-wetting agent (briefly "wetting agent") dissolved therein; (ii) a working electrode (e.g. anode) that contains the graphite mineral powder as an active material in ionic contact with the liquid solution electrolyte; and (iii) a counter electrode (e.g. cathode) in ionic contact with the liquid solution electrolyte, and wherein a current is imposed upon the working electrode and the counter electrode at a current density for a duration of time sufficient for effecting electrochemical intercalation of the intercalating agent and/or the wetting agent into the interlayer spacing, wherein the wetting agent is selected from melamine, ammonium sulfate, sodium dodecyl sulfate, sodium (ethylenediamine), tetraalkyammonium salts, ammonia, carbamide, hexamethylenetetramine, organic amine, pyrene, 1-pyrenecarboxylic acid (PCA), 1-pyrenebutyric acid (PBA), 1-pyrenamine (PA), poly(sodium-4-styrene sulfonate), or a combination thereof; and (b) exfoliating and separating the hexagonal carbon atomic interlayers from the intercalated graphite compound using an ultrasonication, thermal shock exposure, mechanical shearing treatment, or a combination thereof to produce the isolated graphene sheets.

Preferably, the concentration of the milled graphite rock or graphite mineral in the liquid solution electrolyte is sufficiently high to achieve a network of electron-conducting pathways, which are in electronic contact with an anode (e.g. via an anode current collector), but not with a cathode.

In an alternative electrochemical intercalation configuration, all the graphite materials to be intercalated and then exfoliated (e.g. milled powder of graphite rock) may be formed into a rod or plate that serves as an anode electrode. A metal or graphite rod or plate serves as a cathode. Both the anode and the cathode are in contact with or dispersed in a liquid solution electrolyte containing an intercalating agent and a wetting agent dissolved therein. In this alternative configuration, no graphite material to be intercalated (e.g. no graphite rock, graphite mineral or mined graphite ore) is dispersed in the liquid electrolyte. A current is then imposed to the anode and the cathode to allow for electrochemical intercalation of the intercalating agent and/or the graphene plane wetting agent into the anode active material (the graphite mineral material). Under favorable conditions (e.g. sufficiently high current density), exfoliation of graphite directly into graphene sheets occur. Alternatively and preferably, the electrochemical intercalation conditions are meticulously controlled to accomplish intercalation (for forming the intercalated graphite compound) without exfoliation. The intercalated compound is then exfoliated by using the procedures described in step (b). Such a two-step procedure is preferred over the direct exfoliation procedure because the latter often occurs in an uncontrollable manner and the electrode (e.g. anode) is broken or disrupted before intercalation into the entire rod can be completed.

The mechanical shearing treatment, used to further separate graphite flakes and possibly reduce the flake size, preferably comprises using air milling (including air jet milling), ball milling, mechanical shearing (including rotating blade fluid grinding), any fluid energy based size-reduction process, ultrasonication, or a combination thereof.

The intercalating agent may contain a Brønsted acid selected from phosphoric acid ($H_3PO_4$), dichloroacetic ($Cl_2CHCOOH$), or an alkylsulfonic acid selected from methanesulfonic ($MeSO_3H$), ethanesulfonic ($EtSO_3H$), or 1-propanesulfonic (n-$PrSO_3H$), or a combination thereof.

In certain embodiments, the intercalating agent includes a metal halide. More specifically, the intercalating agent includes a metal halide selected from the group consisting of MCl (M=Li, Na, K, Cs), $MCl_2$ (M=Zn, Ni, Cu, Mn), $MCl_3$ (M=Al, Fe, Ga), $MCl_4$ (M=Zr, Pt), $MF_2$ (M=Zn, Ni, Cu, Mn), $MF_3$ (M=Al, Fe, Ga), $MF_4$ (M=Zr, Pt), and combinations thereof.

Alternatively, the intercalating agent can include an alkali metal salt and this salt can be dispersed in an organic solvent or an ionic liquid. Preferably, the alkali metal salt is selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium (NaN($CF_3SO_2$)$_2$), sodium trifluoromethanesulfonimide (NaTFSI), bis-trifluoromethyl sulfonylimide potassium (KN($CF_3SO_2$)$_2$), a sodium ionic liquid salt, lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium (LiN($CF_3SO_2$)$_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3$($CF_2CF_3$)$_3$), lithium bisperfluoro-ethysulfonylimide (Li-BETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

Preferably, the organic solvent used to dissolve the alkali metal salt is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, propylene carbonate, ethylene carbonate (EC), dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, or a combination thereof. Essentially all of these solvents can be used in the present electrochemical intercalation method to facilitate intercalation of alkali metal ions (e.g. $Li^+$, $Na^+$, or $K^+$) into inter-graphene plane spaces. Under favorable electrochemical conditions, most of these organic solvents are capable of intercalating into these inter-planar spaces.

The wetting agent is selected from melamine, ammonium sulfate, sodium dodecyl sulfate, sodium (ethylenediamine), tetraalkylammonium salts, ammonia, carbamide, hexamethylenetetramine, organic amine, poly(sodium-4-styrene sulfonate), or a combination thereof. We have surprisingly observed several advantages that can be achieved by adding a wetting agent in the electrolyte, in addition to an intercalating agent. . . Typically, the addition of a wetting agent to the liquid solution electrolyte leads to thinner graphene sheets as compared to the electrochemical intercalation electrolyte containing no wetting agent. This is reflected by the typically larger specific surface areas of the mass of graphene sheets produced after exfoliation as measured by the well-known BET method. It seems that the wetting agent can readily spread into inter-layer spaces, stick to a graphene plane, and prevent graphene sheets, once formed, from being re-stacked together. This is a particularly desirable feature considering the fact that graphene planes, when separated, have a great tendency to re-stack again. The presence of these graphene plane wetting agent serves to prevent re-stacking of graphene sheets.

Some of the wetting agents (e.g. those containing an amine group) also serve to chemically functionalize the isolated graphene sheets, thereby improving the chemical or mechanical compatibility of the graphene sheets with a matrix resin (e.g. epoxy) in a composite material.

It is quite surprising that sodium ions and potassium ions, albeit significantly larger than lithium ions in terms of ionic radii, can be intercalated into all kinds of graphite materials using the instant electrochemical configurations and method. Further unexpectedly, mixed ions (e.g. $Li^+ + Na^+$, or $Li^+ + K^+$) intercalated into inter-graphene plane spacing of a graphite material are more effective than single-ion species (e.g. $Li^+$ only) in exfoliating graphite to form thinner graphene sheets.

We have found that the invented electrochemical intercalation (with certain alkali metal salts and certain solvents and/or wetting agent) and thermal exfoliation can led to the formation of NGPs with an average thickness smaller than 5 nm. However, stage-2 and stage-3 graphite intercalation compounds can lead to graphene platelets thicker than 5 nm. In order to further reduce the platelet thickness, we have conducted further studies and found that repeated electrochemical intercalations/exfoliations are an effective method of producing ultra-thin, nano-scaled graphene platelets with an average thickness smaller than 2 nm or 5 graphene planes in each sheet or platelet and, in many cases, mostly single-layer graphene.

It may be noted that, in a traditional graphite intercalation compound (GIC) obtained by intercalation of a laminar graphite material, the intercalant species may form a complete or partial layer in an inter-layer space or gallery. If there always exists one graphene layer between two neighboring intercalant layers, the resulting graphite is referred to as a Stage-1 GIC (i.e. on average, there is one intercalation layer per one graphene plane). If n graphene layers exist between two intercalant layers, we have a Stage-n GIC. Alkali metal-intercalated graphite compounds were found to be stage-2, stage-3, stage-4, or stage-5, depending on the type of carboxylic acid used. It is generally believed that a necessary condition for the formation of all single-layer graphene is to have a perfect Stage-1 GIC for exfoliation. Even with a Stage-1 GIC, not all of the graphene layers get exfoliated for reasons that remain unclear. Similarly, exfoliation of a Stage-n GIC (with n>5) tends to lead to a wide distribution of NGP thicknesses (mostly much greater than n layers). In other words, exfoliation of Stage-5 GICs often yields NGPs much thicker than 10 or 20 layers. Hence, a major challenge is to be able to consistently produce NGPs with well-controlled dimensions (preferably ultra-thin) from acid-intercalated graphite. In this context, it was surprising for us to discover that the instant method can consistently lead to the formation of few-layer graphene and/or single-layer graphene only. The production yield is typically higher than 70%, more typically higher than 80%, and most typically higher than 90%.

The following examples serve to provide the best modes of practice for the present invention and should not be construed as limiting the scope of the invention:

EXAMPLE 1

Production of Isolated Graphene Sheets from Milled Graphite Rock (Graphite Ore or Mineral)

Graphite rock (graphite ore or mineral), milled to an average diameter<10 μm, was used as the anode material and 1,000 mL of a liquid solution electrolyte (typically 0.5-3 M of an alkali metal salt in an organic solvent). Ethylene carbonate (EC), propylene carbonate (PC), and diethyl carbonate (DEC) were used as the solvent. The alkali metal salts used in this example include lithium perchlorate ($LiClO_4$), sodium perchlorate ($NaClO_4$), potassium perchlorate ($KClO_4$), and their mixtures. The graphene plane wetting agents selected include melamine, sodium (ethylenediamine), and hexamethylenetetramine.

The anode supporting element is a stainless steel plate and the cathode is a graphite foam of approximately 4 cm in diameter and 0.2 cm in thickness, impregnated with lithium or sodium. The separator, a glass fiber fabric, was used to separate the cathode plate from the milled graphite rock particles and to compress these particles down against the anode supporting element to ensure that the particles are in electrical connection with the anode supporting element to serve as the anode. The electrodes, electrolyte, and separator are contained in a Buchner-type funnel to form an electrochemical cell. The anode supporting element, the cathode, and the separator are porous to permit intercalate (contained in the electrolyte) to saturate the graphite and to pass through the cell from top to bottom.

The milled graphite rock particles were subjected to an electrochemical charging treatment (i.e. charging alkali metal ions into inter-graphene plane spaces in a graphitic structure at a current of 0.5 amps (current density of about 0.04 amps/$cm^2$) and at a cell voltage of about 4-6 volts for 2-5 hours. These values may be varied with changes in cell configuration and makeup. Following electrochemical charging treatment, the resulting intercalated particles (beads) were washed with water and dried.

Subsequently, some of the alkali metal ion-intercalated compound was transferred to a water bath. The compound, upon contact with water, was found to induce extremely rapid and high expansions of graphite crystallites. Subsequently, some portion of this expanded/exfoliated graphite solution was subjected to sonication. Various samples were collected with their morphology studied by SEM and TEM observations and their specific surface areas measured by the well-known BET method.

TABLE 1

Results of varying types of liquid electrolytes (alkali metal salts, solvents, and wetting agents).

| Sample | Intercalating agents | Wetting agent | Specific surface area ($m^2/g$) | Comments |
|---|---|---|---|---|
| P-1 | $LiClO_4$ in EC | None | 720 | >65% single-layer |
| P-1-w | $LiClO_4$ in EC | Melamine | 824 | >80% single-layer |
| P-2 | $NaClO_4$ in EC | None | 810 | >80% single-layer |
| P-2-w | $NaClO_4$ in EC | Melamine | 910 | >90% single-layer |
| P-3 | $KClO_4$ in EC | None | 625 | >40% single-layer |
| P-3-w | $KClO_4$ in EC | Melamine | 690 | >60% single-layer |
| P-4 | ($LiClO_4$ + $NaClO_4$) in EC | None | 885 | >85% single-layer |
| P-4-w | ($LiClO_4$ + $NaClO_4$) in EC | Sodium (ethylene-diamine) | 915 | >90% single-layer |
| P-5 | ($LiClO_4$ + $KClO_4$) in EC | None | 730 | >70% single-layer |
| P-5-w | ($LiClO_4$ + $KClO_4$) in EC | Sodium (ethylene-diamine) | 823 | >80% single-layer |
| P-6 | $NaClO_4$ + PC | None | 683 | >60% single-layer |
| P-6-w | $NaClO_4$ + PC | Hexamethylene tetramine | 810 | >80% single-layer |
| P-7 | $LiClO_4$ + PC | None | 640 | >50% single-layer |
| P-7-w | $LiClO_4$ + PC | Hexamethylene tetramine | 756 | >70% single-layer |

Several important observations may be made from the data in this table:
1) The intercalating electrolyte containing a graphene plane wetting agent leads to thinner (mostly single-layer) graphene sheets as compared to the electrolyte containing no such wetting agent.
2) Larger alkali metal ions ($Na^+$ and $K^+$), relative to $Li^+$, are also effective intercalant when it comes to the production of ultra-thin graphene sheets. Actually, $Na^+$ ions are more effective than $Li^+$ in this aspect.
3) A mixture of two alkali metal salts (e.g. $LiClO_4$+ $NaClO_4$) is more effective than single components alone in producing single-layer graphene sheets.
4) EC appears to be more effective than PC.
5) Products containing a majority of graphene sheets being single-layer graphene can be readily produced using the presently invented electrochemical intercalation method.

Certain amounts of the mostly multi-layer graphene sheets were then subjected to re-intercalation under comparable electrochemical intercalation conditions to obtain re-intercalated NGPs. Subsequently, these re-intercalated NGPs were transferred to an ultrasonication bath ultra-thin NGPs. Electron microscopic examinations of selected samples indicate that the majority of the resulting NGPs are single-layer graphene sheets.

COMPARATIVE EXAMPLE 1

Sulfuric-Nitric Acid-Intercalated Graphite Rock Particles

One gram of milled graphite rock powder as used in Example 1 were intercalated with a mixture of sulfuric acid, nitric acid, and potassium permanganate at a weight ratio of 4:1:0.05 (graphite-to-intercalate ratio of 1:3) for four hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exfoliated at 1,000° C. for 45 seconds. The resulting NGPs were examined using SEM and TEM and their length (largest lateral dimension) and thickness were measured. It was observed that the presently invented electrochemical intercalation method leads to graphene sheets of comparable thickness distribution, but much larger lateral dimensions (3-5 μm vs. 200-300 nm). Graphene sheets were made into graphene paper layer using a well-known vacuum-assisted filtration procedure. The graphene paper prepared from hydrazine-reduced graphene oxide (made from sulfuric-nitric acid-intercalated graphite) exhibits electrical conductivity values of 25-350 S/cm. The graphene paper prepared from the relatively oxidation-free graphene sheets made by the presently invented electrochemical intercalation exhibit conductivity values of 2,500-4,500 S/cm.

EXAMPLE 2

Graphene Sheets from Milled Graphite Rock (Graphite Ore or Mineral)

Samples of two grams each of graphite rock containing 56% natural flake graphite were milled down to an average diameter of 18.3 μm. The powder samples were subjected to similar electrochemical intercalation conditions described in Example 1, but with different alkali metal salts and solvents. The graphite rock powder samples were subjected to an electrochemical intercalation treatment at a current of 0.5 amps (current density of about 0.04 amps/$cm^2$) and at a cell voltage of about 6 volts for 3 hours. Following the electrochemical intercalation treatment, the resulting intercalated flake was removed from the electrochemical reactor and dried.

Subsequently, the intercalated compound was transferred to a furnace pre-set at a temperature of 950° C. for 45 seconds. The compound was found to induce rapid and high expansions of graphite crystallites with an expansion ratio of greater than 100. After a mechanical shearing treatment in a high-shear rotating blade device for 15 minutes, the resulting NGPs exhibit a thickness ranging from single-layer graphene sheets to 8-layer graphene sheets based on SEM and TEM observations. Results are summarized in Table 2 below:

TABLE 2

Results of varying types of intercalating agents and wetting agents.

| Sample | Alkali metal salt in solvent | Wetting agent | Specific surface area ($m^2/g$) | Comments |
|---|---|---|---|---|
| R-1 | $LiPF_6$ + PC | None | 712 | >65% single-layer |
| R-1-w | $LiPF_6$ + PC | Tetraalkyl-ammonium | 785 | >75% single-layer |
| R-2 | ($LiPF_6$ + $NaPF_6$) + PC | None | 780 | >75% single-layer |
| R-2-w | ($LiPF_6$ + $NaPF_6$) + PC | Tetraalkyl-ammonium | 854 | >85% single-layer |

TABLE 2-continued

Results of varying types of intercalating agents and wetting agents.

| Sample | Alkali metal salt in solvent | Wetting agent | Specific surface area (m²/g) | Comments |
|---|---|---|---|---|
| R-3 | LiBF$_4$ + PC | None | 670 | >60% single-layer |
| R-3-w | LiBF$_4$ + PC | Carbamide | 740 | >70% single-layer |
| R-4 | LiTFSI + (PC + EC) | None | 675 | >60% single-layer |
| R-4-w | LiTFSI + (PC + EC) | Carbamide | 766 | >70% single-layer |
| R-5 | LiPF$_6$ + DOL | None | 630 | >50% single-layer |
| R-5-w | LiPF$_6$ + DOL | Organic amine | 722 | >65% single-layer |
| R-6 | LiPF$_6$ + DME | None | 665 | >60% single-layer |
| R-6-w | LiPF$_6$ + DME | Organic amine | 776 | >75% single-layer |

It may be noted that the interstitial spaces between two hexagonal carbon atomic planes (graphene planes) are only approximately 0.28 nm (the plane-to-plane distance is 0.34 nm). A skilled person in the art would predict that larger molecules and/or ions (K$^+$ vs. Li$^+$) cannot intercalate into interstitial spaces of a layered graphite material. After intensive R&D efforts, we found that electrochemical methods with a proper combination of an alkali metal salt and solvent, and an adequate magnitude of the imposing current density could be used to open up the interstitial spaces to accommodate much larger molecules and/or ions. The presence of a graphene plane-wetting agent serves to prevent exfoliated graphene sheets from being re-stacked back to a graphite structure.

Re-intercalation of those multi-layer NGPs and subsequent exfoliation resulted in further reduction in platelet thickness, with an average thickness of approximately 0.75 nm (approximately 2 graphene planes on average).

EXAMPLE 3

Production of Isolated Graphene Sheets from Electrochemical Interaction, Exfoliation, and Separation of Milled Graphite Rock in an Aqueous Electrolyte Solution Samples of two grams each of graphite ore powder were milled down to an average size of 27 μm. The powder samples were subjected to electrochemical intercalation in aqueous electrolyte. A broad array of metal halide salts were dissolved in deionized water to form a liquid electrolyte. The wetting agents investigated include ammonia, ammonium sulfate, and sodium dodecyl sulfate. The graphite ore samples were subjected to an electrochemical intercalation treatment at a current of 0.5 amps (current density of about 0.04 amps/cm²) and at a cell voltage of about 1.8 volts for 3 hours. Following the electrochemical intercalation treatment, the resulting intercalated graphite (mostly Stage-1 GIC with some Stage-2) was removed from the electrochemical reactor and dried.

Subsequently, the intercalated compound was transferred to a furnace pre-set at a temperature of 1,050° C. for 60 seconds. The compound was found to induce rapid and high expansions of graphite crystallites with an expansion ratio of greater than 200. After a mechanical shearing treatment in a high-shear rotating blade device for 15 minutes, the resulting NGPs exhibit a thickness ranging from single-layer graphene sheets to 5-layer graphene sheets based on SEM and TEM observations. Results are summarized in Table 3 below. It is clear that a wide variety of metal salts (MCl, MCl$_2$, and MCl$_3$, etc.; M=a metal) dissolved in a select solvent (e.g. water) can be utilized as an intercalating agent in the presently invented method, making this a versatile and environmentally benign approach (e.g. as opposed to the conventional method using strong sulfuric acid and oxidizing agents). It is also surprising to discover that a graphene plane wetting agent can be used to significantly improve the electrochemical intercalation and exfoliation process for the production of ultra-thin graphene sheets.

TABLE 3

Results of varying types of intercalating and wetting agents.

| Sample | Aqueous electrolyte | Wetting agent | Specific surface area (m²/g) | % of single or few-layer graphene sheets (1-10 layers) |
|---|---|---|---|---|
| C-1 | LiCl + water | None | 310 | >35% |
| C-1-w | LiCl + watr | Ammonium sulfate | 425 | >60% |
| C-2 | LiI + water | None | 225 | >20% |
| C-2-w | LiI + water | Ammonium sulfate | 414 | >60% |
| C-3 | NaCl + water | None | 210 | >15% |
| C-3-w | NaCl + water | Sodium dodecyl sulfate | 385 | >50% |
| C-4 | NaF + water | None | 224 | >20% |
| C-4-w | NaF + water | Sodium dodecyl sulfate | 345 | >40% |
| C-5 | NaCl + LiCl + water | None | 270 | >30% |
| C-5-w | NaCl + LiCl + water | Ammonium sulfate | 356 | >40% |
| C-6 | ZnCl$_2$ + water | None | 202 | >15% |
| C-6-w | ZnCl$_2$ + water | Ammonia | 355 | >40% |
| C-7 | FeCl$_3$ + water | None | 330 | >35% |
| C-7-w | FeCl$_3$ + water | Ammonia | 450 | >60% |

COMPARATIVE EXAMPLE 3

Conventional Hummers Method

Highly intercalated and oxidized graphite was prepared by oxidation of milled graphite particles (same as in Example 3) with sulfuric acid, nitrate, and potassium permanganate according to the method of Hummers [U.S. Pat. No. 2,798,878, Jul. 9, 1957]. Upon completion of the reaction (10 hours allowed), the mixture was poured into deionized water and filtered. The sample was then washed with 5% HCl solution to remove most of the sulfate ions and residual salt and then repeatedly rinsed with deionized water until the pH of the filtrate was approximately 5. The intent was to remove all sulfuric and nitric acid residue out of graphite interstices. The slurry was spray-dried and stored in a vacuum oven at 65° C. for 24 hours. The interlayer spacing of the resulting powder was determined by the Debey-Scherrer X-ray technique to be approximately 0.75 nm (7.5 Å), indicating that graphite has been converted into graphite oxide (Stage-1 and Stage-2 GICs). The dried, intercalated compound was placed in a quartz tube and inserted into a horizontal tube furnace pre-set at 950° C. for 35 seconds. The exfoliated worms were mixed with water and then subjected to a mechanical shearing treatment using a high-shear dispersion machine for 20 minutes. The resulting graphene sheets were found to have a thickness of 2.1-7.7 nm (specific surface areas from 185 to 325 m²/g). These values are not nearly as good as what is achieved by the instant method, which is also more environmentally benign.

The invention claimed is:

1. A method of producing isolated graphene sheets directly from a supply of graphite mineral powder comprising therein graphene planes with an interlayer spacing, said method comprising:
    (a) forming an intercalated graphite compound by an electrochemical intercalation procedure which is conducted in an intercalation reactor, wherein said reactor comprises (i) a liquid solution electrolyte comprising intercalating agents and a graphene plane-wetting agent dissolved therein, wherein the intercalating agents comprise lithium perchlorate and at least one of sodium perchlorate and potassium perchlorate; (ii) a working electrode that comprises said graphite mineral powder as an active material in ionic contact with said liquid solution electrolyte; and (iii) a counter electrode in ionic contact with said liquid solution electrolyte, and wherein a current is imposed upon said working electrode and said counter electrode at a current density for a duration of time sufficient for effecting electrochemical intercalation of said intercalating agents and/or said wetting agent into said interlayer spacing, wherein said wetting agent is melamine, sodium (ethylenediamine), hexamethylenetetramine, 1-pyrenamine, or a combination thereof; and
    (b) exfoliating and separating said graphene planes from said intercalated graphite compound using an ultrasonication, thermal shock exposure, mechanical shearing treatment, or a combination thereof to produce said isolated graphene sheets.

2. The method of claim 1, wherein said method is conducted intermittently or continuously and said supply of graphite mineral powder and said liquid solution electrolyte are provided into said reactor intermittently or continuously.

3. The method of claim 1, wherein said graphite mineral powder comprises a proportion of layered graphite material in the range from 20% to 97% by weight.

4. The method of claim 1, wherein said graphite mineral powder comprises a proportion of layered graphite material in the range from 30% to 90% by weight.

5. The method of claim 1, wherein said working electrode comprises no other graphite material than said graphite mineral powder as an electrode active material to be intercalated.

6. The method of claim 1, wherein said mechanical shearing treatment comprises operating air milling, air jet milling, ball milling, rotating-blade mechanical shearing, or a combination thereof.

7. The method of claim 1, wherein the imposing current provides a current density in the range of 0.1 to 600 A/m².

8. The method of claim 1, wherein the imposing current provides a current density in the range of 1 to 500 A/m².

9. The method of claim 1, wherein the imposing current provides a current density in the range of 10 to 300 A/m².

10. The method of claim 1, wherein said thermal shock exposure comprises heating said intercalated graphite to a temperature in the range of 300-1,200° C. for a period of 15 seconds to 2 minutes.

11. The method of claim 1, wherein said isolated graphene sheets comprise single-layer graphene.

12. The method of claim 1, wherein said isolated graphene sheets comprise few-layer graphene having 2-10 graphene planes.

13. The method of claim 1, wherein said electrochemical intercalation comprises intercalation of both said intercalating agents and said wetting agent into the interlayer spacing.

14. The method of claim 1, wherein said intercalated graphite compound comprises Stage-1, Stage-2, or a combination of Stage-1 and Stage-2 graphite intercalation compounds.

15. The method of claim 1, further comprising a step of re-intercalating said isolated graphene sheets using an electrochemical or chemical intercalation method to obtain intercalated graphene sheets followed by a step of further exfoliating and separating said intercalated graphene sheets to produce single-layer graphene sheets using ultrasonication, thermal shock exposure, exposure to water solution, mechanical shearing treatment, or a combination thereof.

16. The method of claim 1, wherein said intercalating agents comprise a dichloroacetic acid ($Cl_2CHCOOH$); or an alkylsulfonic acid selected from the group consisting of methanesulfonic ($MeSO_3H$), ethanesulfonic ($EtSO_3H$), or 1-propanesulfonic (n-$PrSO_3H$); and combinations thereof.

17. The method of claim 1, wherein said intercalating agents comprise a metal halide.

18. The method of claim 1, wherein said intercalating agents further comprise an alkali metal salt selected from the group consisting of sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), a sodium ionic liquid salt, lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato) borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid lithium salt, and combinations thereof.

19. The method of claim 1, wherein said intercalating agents comprise an organic solvent which is tetraethylene glycol dimethylether (TEGDME), poly(ethylene glycol) dimethyl ether (PEGDME), diethylene glycol dibutyl ether (DEGDBE), 2-ethoxyethyl ether (EEE), or a combination thereof.

20. The method of claim 1, wherein multiple particles of said graphite mineral powder are dispersed in said liquid solution electrolyte, disposed in a working electrode compartment, and supported or confined by a current collector in electronic contact therewith, and wherein said working electrode compartment and said multiple particles supported thereon or confined therein are not in electronic contact with said counter electrode.

21. The method of claim 20, wherein said multiple particles are clustered together to form a network of electron-conducting pathways.

22. The method of claim 20, wherein said method is conducted intermittently or continuously and said supply of graphite mineral powder and said liquid solution electrolyte are provided into said working electrode compartment intermittently or continuously.

23. The method of claim 20, wherein said graphite mineral powder in said working electrode compartment is dispersed in the liquid solution electrolyte at a concentration higher than 20% by weight.

24. The method of claim 20, wherein said graphite mineral powder in said working electrode compartment is dispersed in the liquid solution electrolyte at a concentration higher than 40% by weight.

25. A method of producing isolated graphene sheets directly from a supply of graphite mineral powder comprising therein graphene planes with an interlayer spacing, said method comprising:
(a) forming an intercalated graphite compound by an electrochemical intercalation procedure which is conducted in an intercalation reactor, wherein said reactor comprises (i) a liquid solution electrolyte comprising intercalating agents dissolved therein, wherein said intercalating agents comprises mixed metal ions; (ii) a working electrode that comprises said graphite mineral powder as an active material in ionic contact with said liquid solution electrolyte; and (iii) a counter electrode in ionic contact with said liquid solution electrolyte, and wherein a current is imposed upon said working electrode and said counter electrode at a current density for a duration of time sufficient for effecting electrochemical intercalation of said intercalating agents into said interlayer spacing; and
(b) exfoliating and separating said graphene planes from said intercalated graphite compound using an ultrasonication, thermal shock exposure, mechanical shearing treatment, or a combination thereof to produce said isolated graphene sheets Wherein during sub process a) said liquid solution consists essentially of 1,3-dioxolane (DOL), 1,2-dimethoxyethane (DME), tetraethylene glycol dimethylether (TEGDME), poly(ethylene glycol), dimethyl ether (PEGDME), diethylene glycol dibutyl ether (DEGDBE), 2-ethoxyethyl ether (EEE), sulfone, sulfolane, ethylene carbonate (EC), propylene carbonate (PC), dimethyl carbonate (DMC), methylethyl carbonate (MEC), diethyl carbonate (DEC), ethyl propionate, methyl propionate, gamma-butyrolactone (y-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), hydrofloroether, or a combination thereof, wherein said intercalating agents comprise two or more alkali metal salts selected from the group consisting of sodium perchlorate ($NaCLO_4$), potassium perchlorate ($KCLO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), a sodium ionic liquid salt, lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato) borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), and an ionic liquid lithium salt.

26. A method of producing isolated graphene sheets directly from a supply of graphite mineral powder without purification comprising therein graphene planes with an interlayer spacing, said method comprising:
(a) forming an intercalated graphite compound by an electrochemical intercalation procedure which is conducted in an intercalation reactor, wherein said reactor comprises (i) a liquid solution electrolyte comprising intercalating agents and a graphene plane-wetting agent dissolved therein; (ii) a working electrode that comprises said graphite mineral powder as an active material in ionic contact with said liquid solution electrolyte; and (iii) a counter electrode in ionic contact with said liquid solution electrolyte, and wherein a current is imposed upon said working electrode and said counter electrode at a current density for a duration of time sufficient for effecting electrochemical intercalation of said intercalating agent and/or said wetting agent into said interlayer spacing, wherein said wetting agent is melamine, ammonium sulfate, sodium (ethylenediamine), carbamide, hexamethylenetetramine, organic amine, 1-pyrenamine, or a combination thereof; and
wherein said intercalating agents comprise two or more salts selected from the group consisting of potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), a sodium ionic liquid salt, lithium hexafluoroarsenide ($LiAsF_6$), bis-trifluoromethyl sulfonylimide lithium ($LiN(CF_3SO_2)_2$), lithium oxalyldifluoroborate ($LiBF_2C_2O_4$), Li-fluoroalkyl-phosphates ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), and an ionic liquid lithium salt;
(b) exfoliating and separating said graphene planes from said intercalated graphite compound using an ultrasonication, thermal shock exposure, mechanical shearing treatment, or a combination thereof to produce said isolated graphene sheets.

* * * * *